US011886301B2

(12) United States Patent
Dixit et al.

(10) Patent No.: US 11,886,301 B2

(45) Date of Patent: Jan. 30, 2024

(54) ENCRYPTION KEY MANAGEMENT

(71) Applicant: Kasten, Inc., Columbus, OH (US)

(72) Inventors: Deepika Dixit, Santa Clara, CA (US); Julio Lopez, Mountain View, CA (US); Thomas Manville, Mountain View, CA (US); Vaibhav Kamra, Sunnyvale, CA (US)

(73) Assignee: KASTEN, INC., Columbus, OH (US)

( * ) Notice: Subject to any disclaimer, the term of this patent is extended or adjusted under 35 U.S.C. 154(b) by 209 days.

(21) Appl. No.: 17/200,310

(22) Filed: Mar. 12, 2021

(65) Prior Publication Data

US 2022/0291999 A1 Sep. 15, 2022

(51) Int. Cl.

*H04L 9/08* (2006.01)
*G06F 11/14* (2006.01)

(52) U.S. Cl.

CPC ...... *G06F 11/1464* (2013.01); *G06F 11/1461* (2013.01); *G06F 11/1469* (2013.01); *H04L 9/0863* (2013.01); *H04L 9/0894* (2013.01)

(58) Field of Classification Search

CPC ......... H04L 9/08; H04L 9/094; H04L 9/0863; H04L 63/08; H04L 63/083; H04L 63/14; G06F 21/62; G06F 21/6218; G06F 21/6272; G06F 21/6281; G06F 11/1469; G06F 11/1458; H04W 12/35; H04W 12/30

See application file for complete search history.

(56) References Cited

U.S. PATENT DOCUMENTS 9,634,999 B1 4/2017 Marion et al.
2005/0228994 A1* 10/2005 Kasai ................. G06F 21/6218 713/168
2008/0219449 A1* 9/2008 Ball ........................ G06F 21/80 380/277
2016/0352518 A1* 12/2016 Ford ....................... H04L 9/088
2018/0278585 A1* 9/2018 Lurey ................. H04L 63/0428
2020/0259637 A1 8/2020 Spohn et al.
2021/0359855 A1* 11/2021 Voss .................... G06F 11/1458
2022/0060317 A1* 2/2022 Ponnuswamy ....... H04L 9/0631

OTHER PUBLICATIONS

Paul Mah: "Synology DSM 6.0 for protecting your business data", Nov. 7, 2016, pp. 1-9, XP055461874.
International Search Report and Written Opinion directed to related International Application No. PCT/IB2021/052331, dated Nov. 24, 2021; 10 pages.

* cited by examiner

*Primary Examiner* — Shaqueal D Wade-Wright

(74) *Attorney, Agent, or Firm* — Sterne, Kessler, Goldstein & Fox P.L.L.C.

(57) ABSTRACT

Disclosed herein are system, method, and computer program product embodiments for encryption key management. An embodiment operates by executing an initial non-backup instance of an application and generates a primary key using a cryptographic algorithm. The embodiment requests a customer to create a passphrase configured to encrypt and decrypt the primary key. The embodiment generates a derived key using a cryptographic algorithm and the customer passphrase as input. The embodiment then encrypts the primary key using the generated derived key and stores the encrypted primary key in a catalog.

15 Claims, 5 Drawing Sheets

ENCRYPTION KEY MANAGEMENT

BACKGROUND

With the advent of cloud-native applications, new data processing systems have been designed for automating computer application, deployment, and management. Cloud-native applications generally require data backup and recovery tools to migrate existing or new applications to cloud platforms. These applications can then utilize native services of those platforms, including security, storage, and database services on data processing systems such as Kubernetes. These data processing systems require robust data protection capabilities.

Data security is an important facet of backup and migration strategy. Information must be protected from unauthorized access, especially when backing up or migrating data within the cloud-native paradigm. To keep this data safe, data encryption is utilized. With the increasing use of cloud-native backups and migration, added security and encryption of data are necessary for data protection within the cloud-native context.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for encryption key management within the cloud-native backup and migration context. With the increasing adoption of cloud-native architectures and platforms, a significant portion of applications and data have moved to cloud orchestrators, such as Kubernetes. Kubernetes is a system for automating deployment, scaling, and management of containerized applications. Kubernetes groups containerized applications in a cluster to allow for more efficient management of containerized applications.

While cloud orchestrators have increased the efficient management of containerized applications, traditional backup and disaster recovery solutions were deficient in these cloud-native environments, typically resulting in scalability issues and data loss. Existing solutions are not built for these types of applications or infrastructure. The existing infrastructure lacks visibility into the composition of applications in clusters and cannot cope with the scale and dynamic nature of microservices-based applications. With cluster orchestrators such as Kubernetes, no single node has a complete application. A node may be running components of different applications along with their data in persistent storage. Therefore, a technological solution is needed to create a per-application backup repository. Moreover, security and encryption of data within cloud-native paradigms would be enhanced by using unique, per-application encryption keys. This technological solution would allow for easy and secure backup and migration of data without compromising data integrity for cloud-native paradigms.

Figure 1:
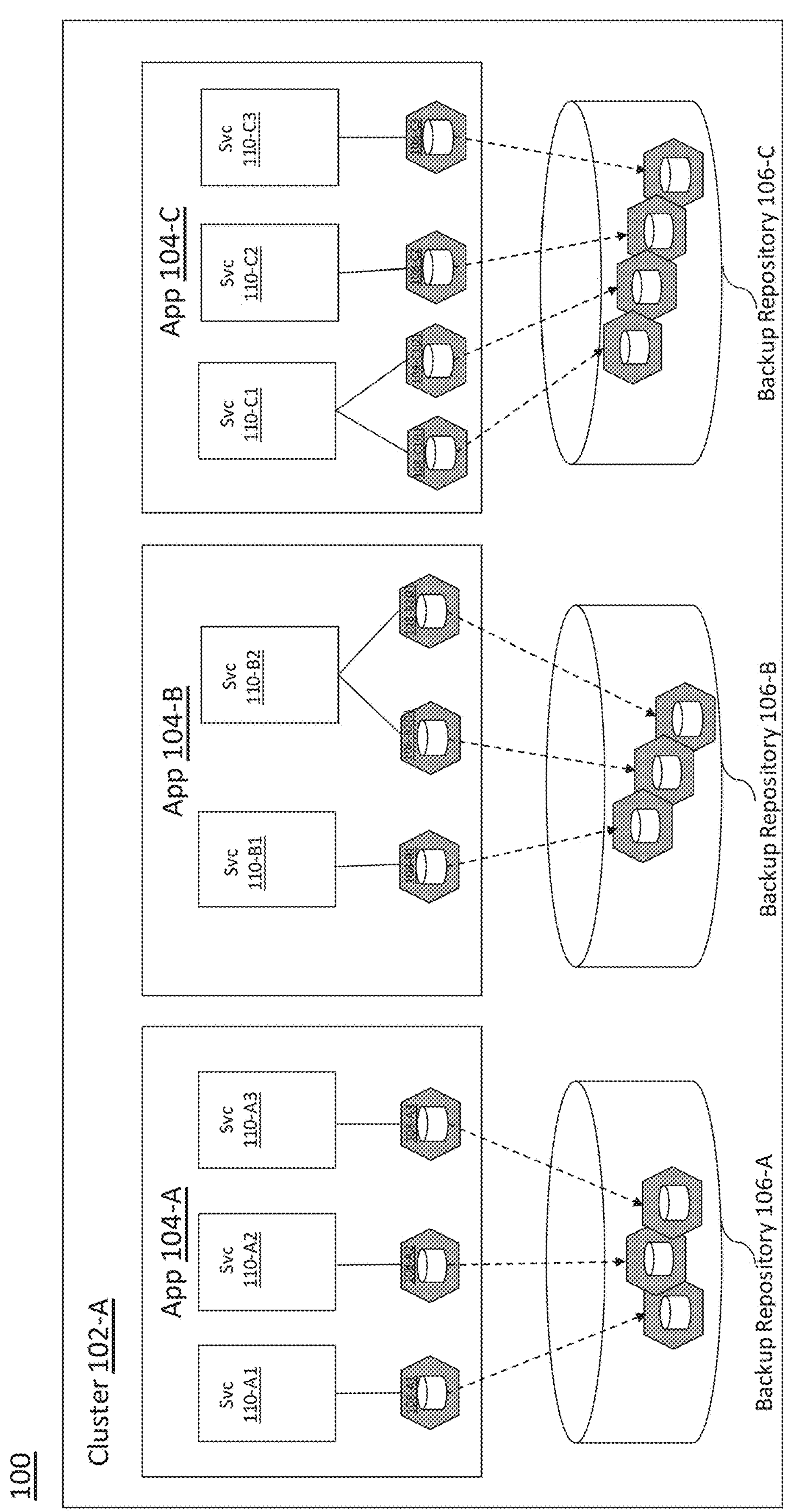
FIG. 1 is a block diagram illustrating a system for a cloud-native transformation engine for backup and migration, according to some embodiments.

FIG. 1 is a block diagram illustrating a cloud-native transformation engine for backup and migration, according to some embodiments. The system 100 is an example embodiment of a cloud orchestrator, such as, but not limited to, Kubernetes. The system 100 may contain one or more applications 104 (104-A, 104-B, 104-C, . . . , 104-X, . . . ). Each application 104 may be a distributed application comprising microservices components 110 (110-A1, 110-A2, 110-A3, . . . , 110-X1 . . . ). Each microservice 110 may have persistent data volumes 108 (108-A1, 108-A2, 108-A3, . . . , 108-X1(1), 108X1(2), . . . ). The applications 104 may be cluster managed by a cloud orchestrator, such as, but not limited to, Kubernetes. The cluster 102 may simultaneously host and run multiple applications 104. The set of applications 104 in a cluster 102 can be dynamic, in which the composition of each application 104 may change over time (e.g., due to upgrades) and the set of applications 104 themselves may also change over time.

In order to back up the underlying data in a cloud orchestrator, the system 100 can use a per-application backup repository 106 (106-A, 106-B, 106-C, . . . , 106-X, . . . ). An entire application 104 can be used as the unit when backing up application data in a backup repository 106. The system 100 can store the data from all the application volumes 108 in a single backup repository 106, such as an object store bucket.

With application-specific backup repositories, a failure in a backup or restore operation for an application does not affect other applications, which increases backup efficiency and reliability. Moreover, data in a backup repository 106 (e.g., 106-A) may all belong to the same application 104 (e.g., 104-A) and data from different applications 104 (e.g., 104-A, 104-B, 104-C, . . . , 104-X) may be stored in separate repositories 106 (e.g., 106-A, 106-B, 106-C, . . . , 106-X) with independent encryption keys. The data may be located in separate repositories 106 each with their own access restrictions.

Figure 2:
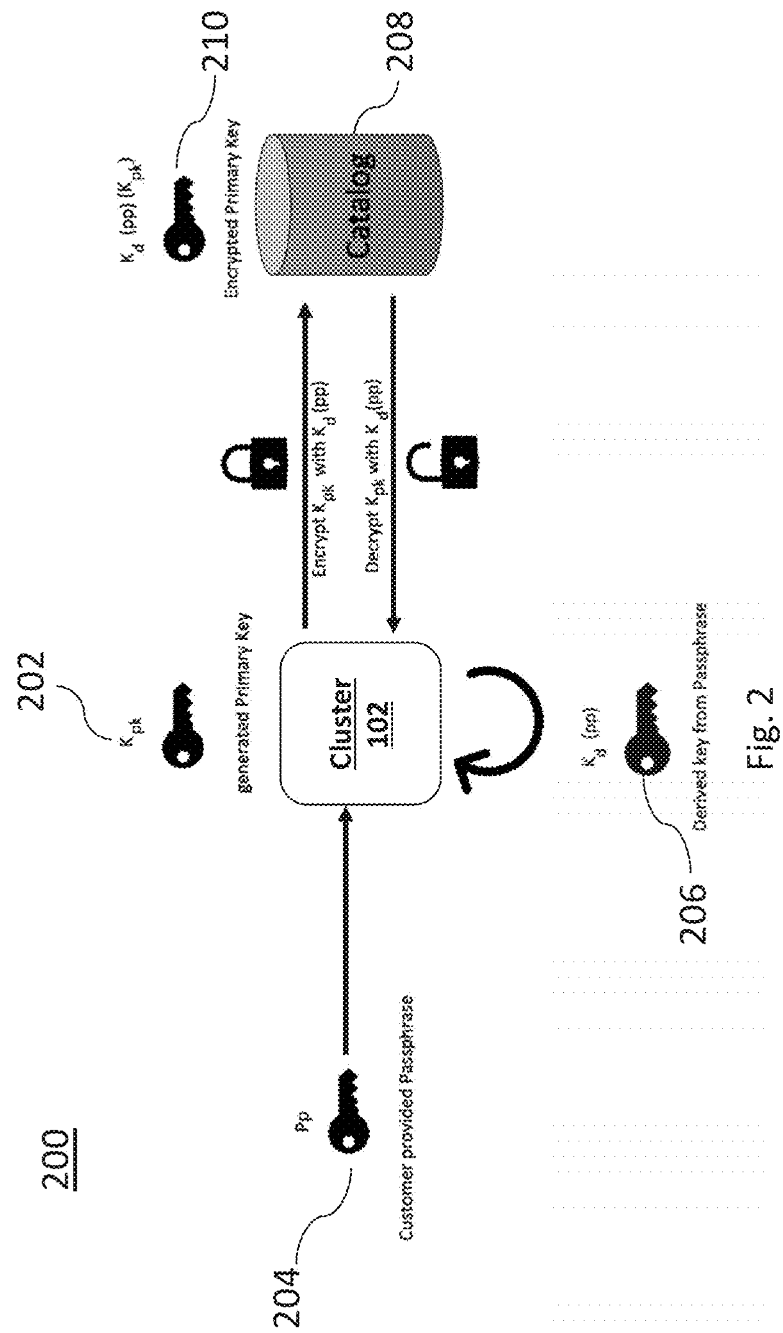
FIG. 2 is a block diagram illustrating a system for primary key generation and encryption, according to some embodiments.

FIG. 2 is a block diagram illustrating a system 200 for generating and encrypting a primary key within the cloud-native paradigm, according to some embodiments. FIG. 2 is described with reference to FIG. 1. The system 200 establishes a first layer of security by using primary key 202, according to some embodiments. A new primary key 202 can be used for every application backup. In some embodiments, a primary key 202 for encrypting external data and metadata may be randomly generated for each instance of an application (e.g., application 104). The auto-generated primary key 202 may be specific to every cluster 102 in the system 100. This can be generated using a cryptographic algorithm. In some embodiments, the cryptographic algorithm is an industry-standard algorithm.

For example, the primary key 202 can be generated using the ChaCha20-Poly1305 algorithm. ChaCha20-Poly1305 is an authenticated encryption algorithm constructed with the ChaCha stream cipher and Poly1305 authenticator. The ChaCha20 stream cipher is built on a pseudorandom function based on add-rotate-XOR (ARX) operations. The core function maps a 256-bit key, a 64-bit nonce, and a 64-bit counter to a 52-bit block of a key stream. Poly1305 is a cryptographic message authentication code that can be used to verify the data integrity and authenticity of a message. These are combined together to produce encryption and authentication. This algorithm may be used to generate the primary key 202 for each instance of an application 104. However, any cryptographic algorithm that would be known to a person of ordinary skill in the art may be used to produce the primary key 202.

Security and encryption of data within cloud-native backups and migration can be enhanced by using customer managed encryption keys. The system 200 establishes a second layer of security by using a customer passphrase 204, according to some embodiments. Once the system 200 generates the primary key 202, the primary key 202 may be encrypted using a customer passphrase 204. The customer passphrase 204 may be a specific passphrase or password for encrypting and decrypting the primary key 202 stored in the catalog 208. According to some embodiments, the customer may be aware of the customer passphrase 204 but may not be aware of the primary key 202.

A customer can rotate through multiple customer passphrases 204 through passkey management. Passkey management allows for customer passphrase 204 rotation. In some embodiments, a customer can add a new customer passphrase 204 to gain access to the primary key 202. In some embodiments, a customer may add a new customer passphrase 204 only if an old customer passphrase 204 is known. In other embodiments, an old customer passphrase 204 can be removed. However, only one customer passphrase 204 can be active at a time, according to some embodiments.

In some embodiments, in order to encrypt the primary key 202 using the customer passphrase 204, the system 200 generates a derived key from passphrase 206 using the customer passphrase 204. This may provide a third layer of security by using a customer passphrase 204 only the customer is aware of, according to some embodiments. The system 200 derives the derived key from passphrase 206 using a cryptographic algorithm and the customer passphrase 204 as inputs, according to some embodiments. In some embodiments, the customer is aware of only the customer passphrase 204 and not the derived key from passphrase 206. The cryptographic algorithm may be an industry standard algorithm that would have been known to a person skilled in the art. For example, the ChaCha20-Poly1305 algorithm can be used to generate the derived key from passphrase 206.

In some embodiments, the derived key from passphrase 206 is used only to encrypt the primary key 202 for storing in a catalog 208. In some embodiments, catalog 208 is used only to store the encrypted primary key 210. Once the derived key from passphrase 206 is generated, the system 200 uses the derived key from passphrase 206 to encrypt the primary key 202 and stores the encrypted primary key 210 in catalog 208. In other embodiments, the encrypted primary key 210 is never stored in plain text anywhere.

Figure 3:
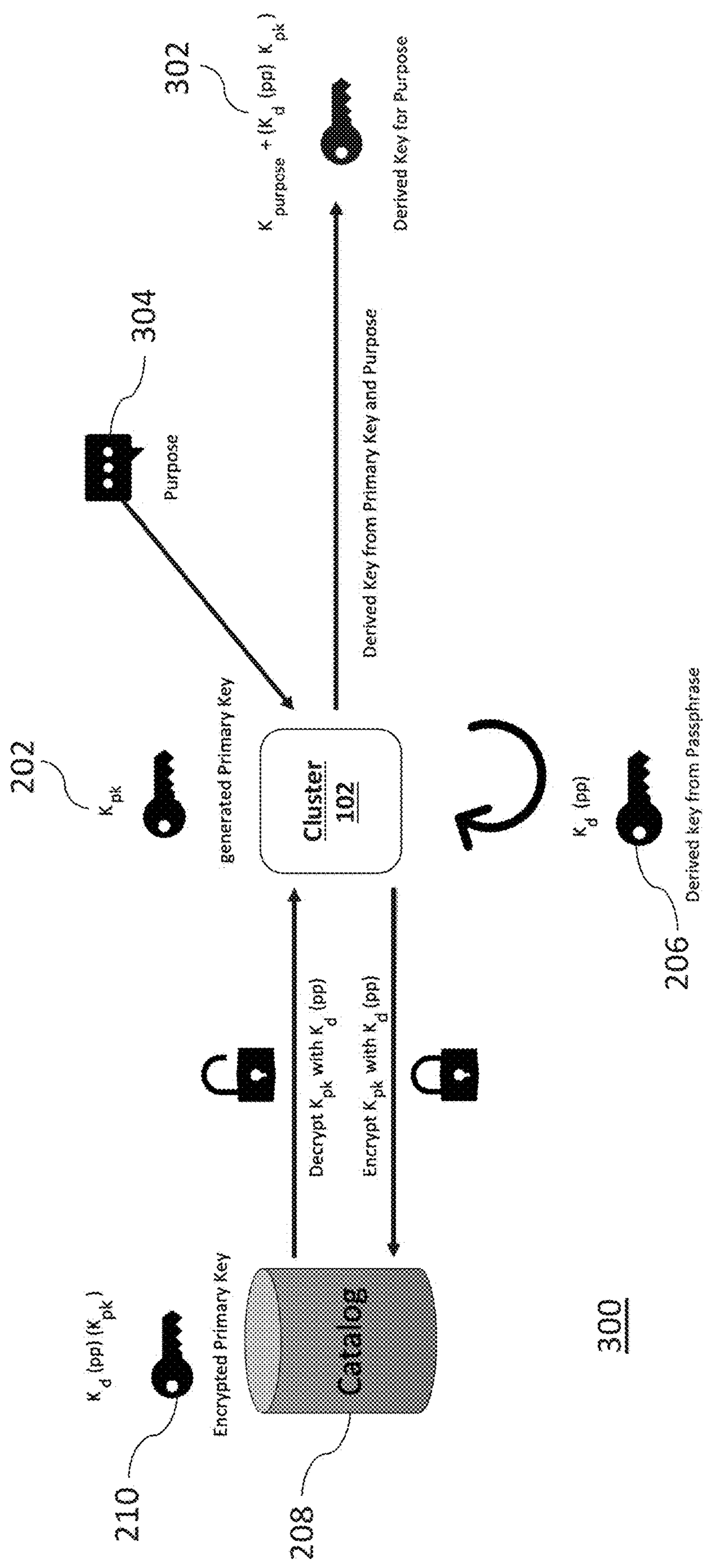
FIG. 3 is a block diagram illustrating a system for generating a derived key based on the purpose for which a decrypted primary key is used, according to some embodiments.

FIG. 3 is a block diagram illustrating a system for generating a derived key for the purpose for which it is used for using the primary key 202, according to some embodiments. FIG. 3 is described with reference to FIG. 1 and FIG. 2. Although the stored encrypted primary key 210 undergoes three levels of security before being stored in catalog 208, the system 100 may be even more secure if different keys are used for each instance of an application 104 for backup and migration in the cloud-native paradigm.

Once the encrypted primary key 210 is stored in catalog 208, the system 100 can generate a new key for backup and migration. To generate a new key for backup and migration, the system 300 decrypts the encrypted primary key 210. The new key can be a derived key for purpose 302 from the decrypted primary key 202 and a purpose 304. The purpose 304 can be the purpose for which the derived key for purpose 302 is used. Examples of the purpose 304 include a backup repository end point or a policy unique to a particular operation. Therefore, for every different purpose 304, there may be a different version of the derived key for purpose 302. In some embodiments, if even one version of the derived key for purpose 302 is exposed, the system 100 does not expose everything that has been backed up or migrated.

According to some embodiments, the derived key for purpose 302 is used within the context of the current operation. Therefore, in some embodiments, the derived key for purpose 302 is not stored anywhere. In order to use the same derived key for purpose 302, the system 100 may need to again use the same decrypted primary key 202 and purpose 304 in another instance of the application 104, according to some embodiments.

Figure 4:
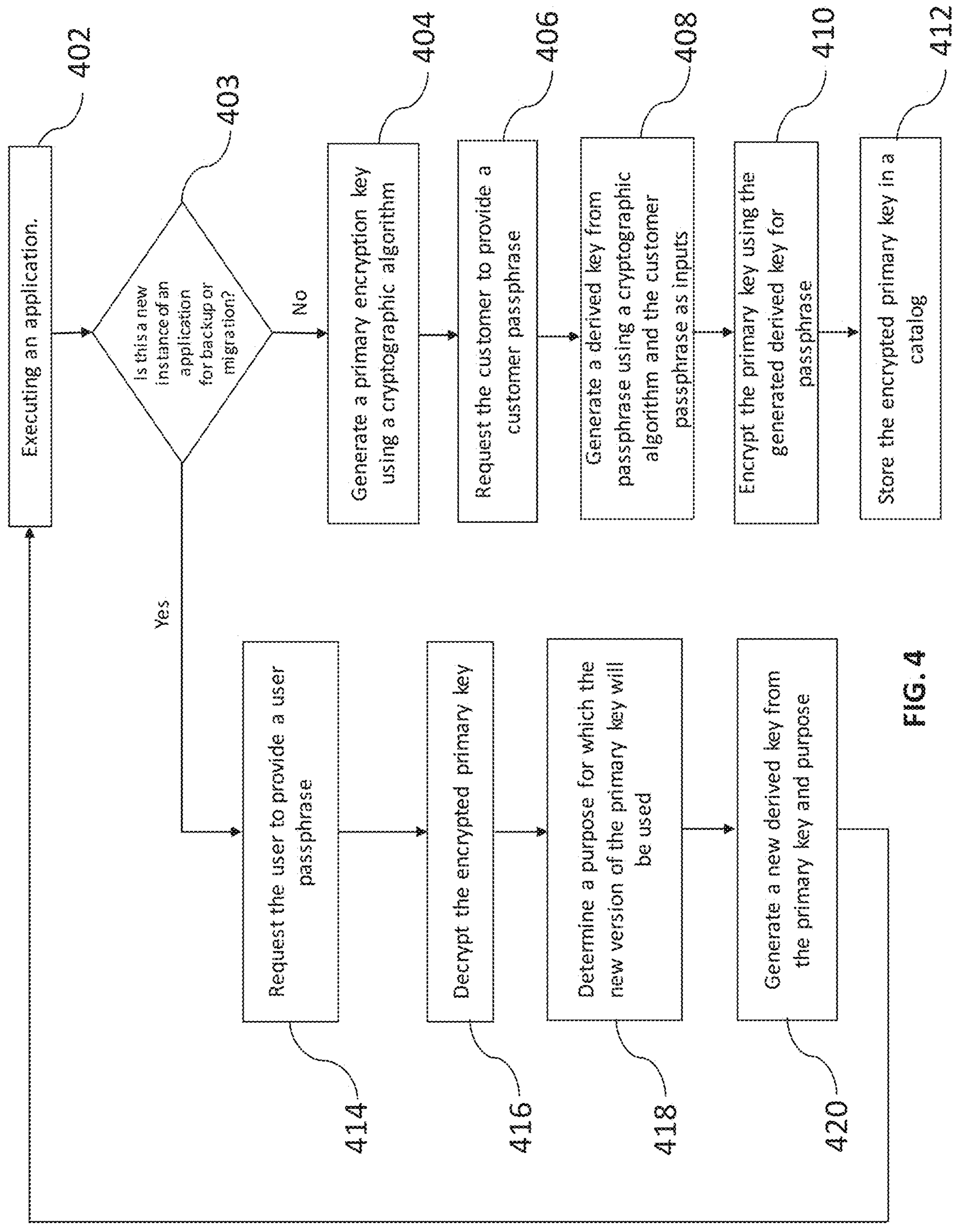
FIG. 4 is a flowchart illustrating a process for an encryption key management method within a cloud-native paradigm, according to some embodiments.

FIG. 4 is a flowchart illustrating a process for an encryption key management method within a cloud-native paradigm, according to some embodiments. FIG. 4 is described with reference to FIG. 1, FIG. 2, and FIG. 3. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

At 402, the system 100 executes an application 104. For example, the cloud orchestrator executes an instance of application 104 in the cluster 102.

At 403, the system 100 determines whether the instance of the application 104 is a new instance of an application 104 for backup or migration. If the system 100 executes the first instance of an application 104, then the system 100 proceeds to 404 to encrypt a primary key 202. In some embodiments, the first instance of an application 104 is the initial non-backup instance of an application 104. In other embodiments, the initial non-backup instance of an application 104 is the instance when the system 100 first executes the application 104 to generate and encrypt a primary key 202. If the system 100 executes a new instance of an application 104 for backup or migration, then system 100 proceeds to 414 to generate a derived key for purpose 302. In some embodiments, the instance of an application 104 for backup or migration is a subsequent instance of the initial non-backup instance of an application 104.

At 404, when the system 100 executes the first non-backup instance of an application 104 in a cluster 102, the system 100 generates a primary key 202 using a cryptographic algorithm. In some embodiments, the cryptographic algorithm can be an industry standard algorithm known to a person of ordinary skill in the art at the time. For example, the system 100 can use an authenticated cryptographic algorithm such as, but not limited to, ChaCha20-Poly1305 to generate the primary key. In some embodiments, the primary key 202 may be unique to each cluster 102 within the system 100. According to some embodiments, the customer is not aware of the primary key 202.

At 406, the customer creates a specific passphrase or password that stays with the customer configured to decrypt the primary key 202 once encrypted. The customer may be a user who created the customer passphrase 204 to encrypt the primary key 202. The customer can add or remove customer passphrases 204, according to some embodiments. However, in some embodiments, there can only be one active customer passphrase 204 at a time. Accordingly, the customer can rotate through multiple customer passphrases 204 to decrypt the primary key 202.

At 408, once the customer has created a customer passphrase configured to decrypt the primary key 202 once encrypted, the system 100 generates a derived key from passphrase 206 using a cryptographic algorithm with the customer passphrase 204 as an input. In some embodiments, the cryptographic algorithm can be an industry standard algorithm known to a person of ordinary skill in the art at the time. For example, the system 100 can use an authenticated cryptographic algorithm such as, but not limited to, ChaCha20-Poly1305 to generate the primary key. Therefore, only the customer can encrypt the primary key 202 using the derived key from passphrase 206 based on the customer passphrase 204 created by the customer.

At 410, once the system 100 generates the derived key from passphrase 206, the system 100 uses the derived key from passphrase 206 to encrypt the primary key 202. The system 100 only uses the derived key from passphrase 206 to encrypt the primary key 202, according to some embodiments. In some embodiments, the system 100 does not store the derived key from passphrase 206.

At 412, once the system 100 uses the derived key from passphrase 206 to encrypt the primary key 202, the system 100 stores the encrypted primary key 210 in a catalog 208. In some embodiments, the encrypted primary key 210 is not stored in the catalog 208 in plain text.

At 414, if the system 100 executes a new instance of the application 104 for backup or migration, the system 100 requests the user to provide the customer passphrase. The system 100 then retrieves the passphrase from the user (hereinafter referred to as the "user passphrase"). In this case, a user can be anyone using the system 100 including the customer who created the customer passphrase 204 to encrypt the primary key or any other user who may or may not have access to the customer passphrase 204.

At 416, the system 100 decrypts the encrypted primary key 210 stored in catalog 208 to retrieve the primary key 202. In some embodiments, the system 100 uses the retrieved user passphrase to decrypt the encrypted primary key 210 stored in the catalog 208. In some embodiments, the user passphrase is identical to the customer passphrase configured to decrypt the encrypted primary key 210.

At 418, the system 100 determines the purpose for which the new version of the primary key 202 may be used. The purpose 304 may be the purpose for which the system 100 uses the derived key for purpose 302. Examples of the purpose 304 include a backup repository end point or a policy unique to a particular operation. For every different purpose 304, there may be a different version of the derived key for purpose 302. Accordingly, in some embodiments, if even one version of the derived key for purpose 302 is exposed, the system 100 does not expose everything that has been backed up or migrated.

At 420, once the system 100 determines the purpose for which the new derived key for purpose 302 is used, the system 100 generates a new derived key from the primary key 202 and purpose 304. If a new instance of the application 104 is executed again and the derived key for purpose 302 and the purpose 304 for this new instance matches the previously determined purpose 304, the system 100 can use the same derived key for purpose 302. If the system 100 again executes a new instance of the application 104 and the purpose 304 for this new instance is different from the previously determined purpose 304, the system 100 generates a different derived key for purpose 302 based on the different purpose 304 and the primary key 202.

Figure 5:
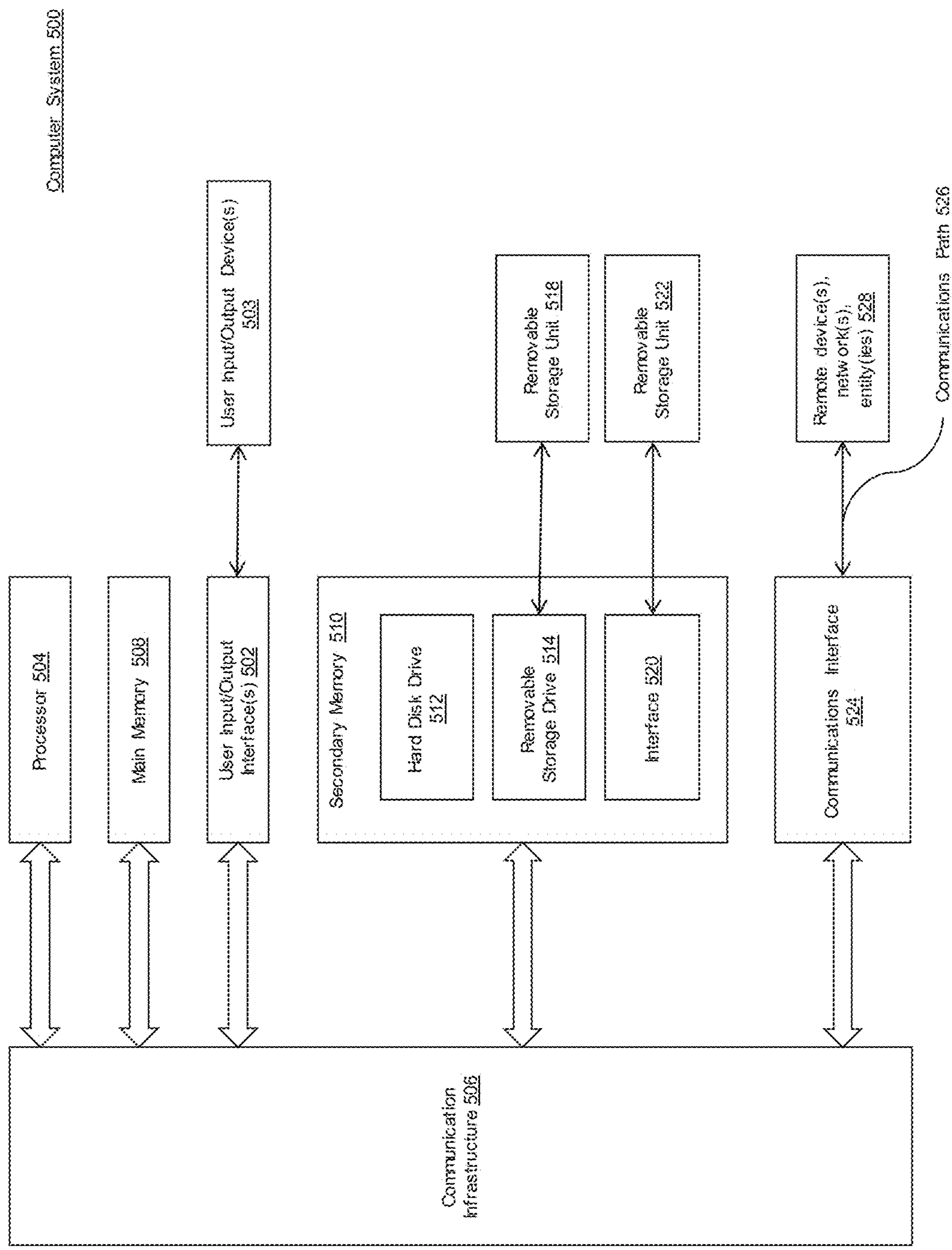
FIG. 5 is an example computer system useful for implementing various embodiments.

Various embodiments can be implemented, for example, using one or more computer systems, such as computer system 500 shown in FIG. 5. FIG. 5 is described with reference to FIG. 2, FIG. 3, and FIG. 4. Computer system 500 can be used, for example, to implement method 400 of FIG. 400. For example, computer system 500 can implement and execute a set of instructions comprising requesting a customer to provide a customer passphrase 204 or generating a primary key 202, a derived key from passphrase 206, and a derived key for purpose 302. Computer system 500 can be any computer capable of performing the functions described herein.

Computer system 500 can be any well-known computer capable of performing the functions described herein.

Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 also includes user input/output device(s) 603, such as monitors, keyboards, pointing devices, etc., that communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:

executing an initial non-backup instance of an application;

generating a primary key using a cryptographic algorithm;

receiving a passphrase configured to encrypt and decrypt the primary key;

generating a derived key from the passphrase using the cryptographic algorithm;

encrypting the primary key using the derived key, thereby producing an encrypted primary key;

storing the encrypted primary key in a catalog;

executing a first instance of the application for backup;

decrypting the encrypted primary key in the catalog, thereby retrieving the primary key;

determining that the primary key is to be used for a first purpose of a backup repository end point for the first instance of the application; and generating a derived key for the first instance of the application based on the primary key and the first purpose, wherein the derived key for the first instance of the application is distinct from a derived key for a second instance of the application, wherein the derived key for the second instance of the application is to be used for a second purpose of a policy for an operation for the second instance of the application.

2. The method of claim 1, further comprising:

adding or removing passphrases.

3. The method of claim 1, wherein the decrypting the encrypted primary key comprises:

requesting a user to provide a user passphrase corresponding to the passphrase;

retrieving the user passphrase; and decrypting the encrypted primary key using the user passphrase, wherein the retrieved user passphrase is identical to the passphrase configured to encrypt and decrypt the primary key.

4. The method of claim 1, wherein the generating the derived key for the first instance of the application comprises:

generating the derived key for the first instance of the application using the cryptographic algorithm, wherein the cryptographic algorithm is a ChaCha20Poly1305 algorithm.

5. The method of claim 1, wherein the generating the primary key comprises:

generating the primary key using the cryptographic algorithm, wherein the cryptographic algorithm is a ChaCha20Poly1305 algorithm.

6. A system, comprising:

a memory; and at least one processor coupled to the memory and configured to:

execute an initial non-backup instance of an application;

generate a primary key using a cryptographic algorithm;

receive a passphrase configured to encrypt and decrypt the primary key;

generate a derived key from the passphrase using the cryptographic algorithm;

encrypt the primary key using the derived key, thereby producing an encrypted primary key;

store the encrypted primary key in a catalog;

execute a first instance of the application for backup;

decrypt the encrypted primary key in the catalog, thereby retrieving the primary key;

determine that the primary key is to be used for a first purpose of a backup repository end point for the first instance of the application; and generate a derived key for the first instance of the application based on the primary key and the first purpose, wherein the derived key for the first instance of the application is distinct from a derived key for a second instance of the application, wherein the derived key for the second instance of the application is to be used for a second purpose of a policy for an operation for the second instance of the application.

7. The system of claim 6, wherein the at least one processor is further configured to:

add or remove passphrases.

8. The system of claim 6, wherein to decrypt the encrypted primary key, the at least one processor is further configured to:

request a user to provide a user passphrase corresponding to the passphrase;

retrieve the user passphrase; and decrypt the encrypted primary key using the user passphrase, wherein the retrieved user passphrase is identical to the passphrase configured to encrypt and decrypt the primary key.

9. The system of claim 6, wherein to generate the derived key for the first instance of the application, the at least one processor further configured to:

generate the derived key for the first instance of the application using the cryptographic algorithm, wherein the cryptographic algorithm is a ChaCha20Poly1305 algorithm.

10. The system of claim 6, wherein to generate the primary key, the at least one processor is further configured to:

generate the primary key using the cryptographic algorithm, wherein the cryptographic algorithm is a ChaCha20Poly1305 algorithm.

11. A non-transitory computer-readable medium having instructions stored thereon that, when executed by at least one computing device, cause the at least one computing device to perform operations comprising:

executing an initial non-backup instance of an application;

generating a primary key using a cryptographic algorithm;

receiving a passphrase configured to encrypt and decrypt the primary key;

generating a derived key from the passphrase using the cryptographic algorithm;

encrypting the primary key using the generated derived key, thereby producing an encrypted primary key;

storing the encrypted primary key in a catalog;

executing a first instance of the application for backup;

decrypting the encrypted primary key in the catalog, thereby retrieving the primary key;

determining that the primary key is to be used for a first purpose of a backup repository end point for the first instance of the application; and generating a derived key for the first instance of the application based on the primary key and the first purpose, wherein the derived key for the first instance of the application is distinct from a derived key for a second instance of the application, wherein the derived key for the second instance of the application is to be used for a second purpose of a policy for an operation for the second instance of the application.

12. The non-transitory computer-readable medium of claim 11, the operations further comprising:

adding or removing passphrases.

13. The non-transitory computer-readable medium of claim 11, wherein the decrypting the encrypted primary key comprises:

requesting a user to provide a user passphrase corresponding to the passphrase;

retrieving the user passphrase; and decrypting the encrypted primary key using the user passphrase, wherein the retrieved user passphrase is identical to the passphrase configured to encrypt and decrypt the primary key.

14. The non-transitory computer-readable medium of claim 11, wherein the generating the derived key for the first instance of the application comprises:

generating the derived key for the first instance of the application using the cryptographic algorithm, wherein the cryptographic algorithm is a ChaCha20Poly1305 algorithm.

15. The non-transitory computer-readable medium of claim 11, wherein the generating the primary key comprises:

generating the primary key using the cryptographic algorithm, wherein the cryptographic algorithm is a ChaCha20Poly1305 algorithm.

* * * * *